UNITED STATES PATENT OFFICE.

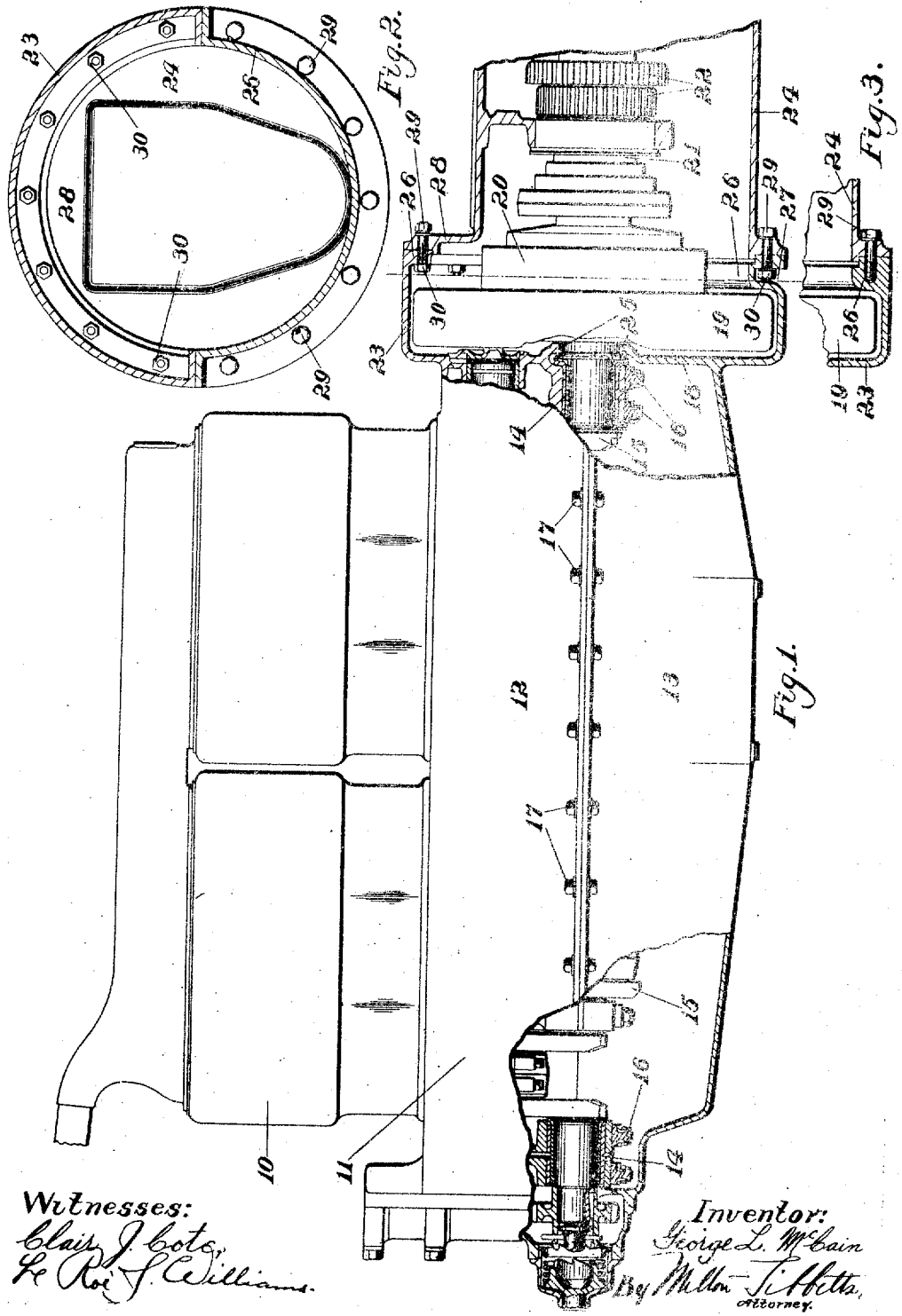

GEORGE L. McCAIN, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,257,371.  Specification of Letters Patent.  Patented Feb. 26, 1918.

Application filed May 18, 1914. Serial No. 839,308.

*To all whom it may concern:*

Be it known that I, GEORGE L. McCAIN, a citizen of the United States, and resident of Detroit, Wayne county, State of Michigan, have invented certain new and useful Improvements in Hydrocarbon-Motors, of which the following is a specification.

This invention relates to hydrocarbon motors and particularly to the crank case construction.

In designing hydrocarbon motors for vehicle use it is desirable that the motor be hung as low as possible in the chassis to keep the center of gravity down, and at the same time considerable clearance under the flywheel is desirable. Preferably therefore, if the flywheel is inclosed, the casing should extend below the flywheel only sufficient to cover it, and any further extension takes directly from the road clearance.

It is desirable in vehicle motor construction that the motor crank shaft and bearings shall be readily accessible.

One of the objects of the present invention is to produce a motor having a removable bottom cover which is provided with means for attachment to a casing while at the same time it provides a maximum of road clearance when the motor is mounted in a chassis.

This and other objects of the invention will appear from the following description taken in connection with the drawings which form a part of the specification, and in which:—

Figure 1 is a side elevation of a motor embodying the invention, parts being broken away;

Fig. 2 is a section on the line 2—2 of Fig. 1; and

Fig. 3 is a detail view showing another form of flange.

In the drawings, 10 represents the two cylinder castings of a six cylinder motor, which castings are mounted upon the motor base or crank case 11 comprising upper and lower parts, 12 and 13, respectively. The upper part 12 is the supporting part and all of the bearings 14 for the crank shaft 15 of the motor are secured to it as by the caps 16. The lower part or bottom cover 13 is detachably connected to the upper part by a tight flange connection and bolts 17, and it will be seen that this cover may be dropped and the entire inside of the crank case, including the crank shaft and bearings, is exposed and accessible.

The crank shaft 15 extends through the rear wall or partition 18 formed as a part of the crank case and has a flywheel 19 secured thereon. From the crankshaft or flywheel the power of the motor is transmitted through a clutch 20 of any desired form, a shaft 21, and change speed gears 22, to the driving wheels of the vehicle.

The flywheel 19 is inclosed or housed by an enlargement or extension 23 of the crank case, this housing being extended somewhat beyond the flywheel and being provided with means for attachment to a casing 24 which is adapted to inclose and support the clutch or gearing or both. It will be seen that this flywheel housing is formed as an integral part of the upper and lower parts of the crank case and that it is separated from the interior of the crank case by the intergral end wall 18, said end wall closely surrounding the crank shaft by a packed joint as at 25 to prevent the oil in the crank case getting into the flywheel and clutch housings.

The rear end of the housing 23, which is of substantially cylindrical form where it surrounds the flywheel is formed with an annular flange 26 turned inwardly as shown in the drawings. In the upper part of the housing this flange is shown solid, as it is also in the lower part in the form of the invention shown in Fig. 3, but in the lower part of the housing shown in Fig. 1 the flange 26 is formed with an annular external groove 27 which in fact makes of it a reëntrant flange. The casing 24 is formed with a flanged forward part 28 adapted to fit the flange 26 and bolts 29 secure the casing to the flange. In the form shown in Fig. 1, through bolts may be used with nuts 30 which are arranged in the groove 27 and therefore accessible from the outside of the casing. In Fig. 3, studs or plain bolts may be used as shown and threaded into the flange 26. Through bolts are desirable when the housing 23 is made of soft metal such as aluminum because of the poor holding effect of bolts threaded into that metal. It will be understood that through bolts may be used in the solid inturned flange of the upper part because the casing 24 may be secured thereto before the lower part is assembled, whereby the interior of the housing is accessible. It will be understood further that the casing 24 will be wholly supported from the upper part 12 of the crank case, as will the crank shaft and flywheel, when the lower part 13 is removed for cleaning or examination.

Because of the form of the attaching means between the casing 24 and the part 13, the road clearance is left at its maximum, there being only enough of the housing 23 under the flywheel to cover it.

It will be understood that the invention is not limited to the specific form shown herein, but is capable of modification in various ways without departing from the spirit or scope of the claims.

Having thus described my invention, what I claim and desire to secure by Letters Patent is:—

1. In a hydrocarbon motor, having a flywheel, the combination with a crank case having an enlarged portion surrounding the flywheel and an inturned flange thereon in a plane at right angles to the longitudinal axis thereof beyond the flywheel, of a casing secured to the crank case at said flange.

2. In a hydrocarbon motor having a flywheel, the combination with a two part crank case having an enlarged portion surrounding the flywheel and an annular inturned flange thereon in a plane at right angles to the longitudinal axis thereof beyond the flywheel, of a casing secured to the crank case at said flange and supported thereby.

3. In a hydrocarbon motor, in combination a crank case comprising an upper supporting part and a lower cover part, a crank shaft having bearings supported wholly by said upper part and having a flywheel at one end, said upper and lower parts extending beyond and covering said flywheel, and a casing so secured to both parts of said crank case beyond the flywheel as to permit the lower part to be removed without disturbing the attachment of the casing to the upper part.

4. In a hydrocarbon motor in combination, a crank case comprising an upper supporting part and a lower cover part, a crank shaft having bearings supported wholly by said upper part and having a flywheel at one end, said upper and lower parts extending beyond and covering said flywheel and having an annular inturned flange, a casing beyond the flywheel, and means for securing said casing to both parts of the crank case so that the lower part may be removed without disturbing the securing means of the casing to the upper part.

5. In a hydrocarbon motor in combination, a crank case comprising upper and lower parts detachably fastened together, a crank shaft having bearings supported wholly by said upper part and having a flywheel at one end, said upper and lower parts extending beyond and housing said flywheel and having a transverse wall immediately inward of said flywheel forming a partition between the crank case chamber and the flywheel housing, a casing secured to the extension of the upper part of the crank case, and means for securing said casing to the extension of the lower part of the crank case so that said lower part may be removed without disturbing the securing means of the casing to the upper part or the bearings of the crank shaft.

6. In a hydrocarbon motor having a flywheel, the combination with a crank case having a part surrounding the flywheel, and an annular flange on said part turned inward, said flange being exteriorly grooved through part of its circumference, of a casing adapted to fit said flange, and means securing said casing to said flange and extending into, and accessible by reason of, said groove.

7. In a hydrocarbon motor having a flywheel, the combination with a crank case having a part surrounding the flywheel, and an annular flange on said part turned inward, said flange being exteriorly grooved through part of its circumference, of a casing adapted to fit said flange, and bolts securing the casing to the crank case and extending into said flange and groove.

8. In a hydrocarbon motor having a flywheel, the combination with a crank case comprising upper and lower parts secured together and having portions extending beyond and housing said flywheel, one of said parts having a flange turned inwardly, and provided with an external groove, of a casing, and means securing said casing to said flange and extending into said groove.

9. In a hydrocarbon motor having a flywheel, the combination with a crank case comprising upper and lower parts secured together and having portions extending beyond and housing said flywheel, one of said parts having a flange turned inwardly, and the other of said parts having a flange turned inwardly forming a continuation of the first mentioned flange and provided with an external groove, of a casing adapted to fit said flanges, and means for securing the casing to the crank case and extending into said flanges and said groove.

10. In a hydrocarbon motor having a flywheel, the combination with a crank case having a part surrounding the flywheel, said part having a reëntrant flange, of a casing at the end of said crank case secured to said flange.

11. In a hydrocarbon motor having a flywheel, in combination, a crank case and a casing adapted to be secured thereto, one of said elements having a part surrounding the flywheel and having an inturned flange, said flange being exteriorly grooved through part of its circumference, and means for
5. securing the crank case and casing together at said flange comprising bolts extending into said groove.

In testimony whereof I affix my signature in the presence of two witnesses.

GEORGE L. McCAIN.

Witnesses:
LELAND W. SMITH,
LE ROI J. WILLIAMS.